(12) United States Patent
Park et al.

(10) Patent No.: US 11,404,743 B2
(45) Date of Patent: Aug. 2, 2022

(54) RECHARGEABLE BATTERY

(71) Applicant: Samsung SDI Co., Ltd., Yongin-si (KR)

(72) Inventors: Yong-Kyun Park, Yongin-si (KR); Hyunhee Kim, Yongin-si (KR); Juhee Sohn, Yongin-si (KR); Donghyun Shin, Yongin-si (KR); Seunghun Lee, Yongin-si (KR); Jungmin Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 131 days.

(21) Appl. No.: 16/649,925

(22) PCT Filed: Sep. 20, 2018

(86) PCT No.: PCT/KR2018/011165
§ 371 (c)(1),
(2) Date: Mar. 23, 2020

(87) PCT Pub. No.: WO2019/088449
PCT Pub. Date: May 9, 2019

(65) Prior Publication Data
US 2020/0303700 A1 Sep. 24, 2020

(30) Foreign Application Priority Data
Nov. 1, 2017 (KR) .................. 10-2017-0144715

(51) Int. Cl.
*H01M 50/325* (2021.01)
*H01M 50/30* (2021.01)

(52) U.S. Cl.
CPC ................ *H01M 50/325* (2021.01)

(58) Field of Classification Search
CPC ..... H01M 50/10; H01M 50/20; H01M 50/325
See application file for complete search history.

(56) References Cited

U.S. PATENT DOCUMENTS

2006/0240315 A1\* 10/2006 Imhof .................. H01M 10/12
429/57
2009/0017365 A1\* 1/2009 Miyahisa ............ H01M 50/325
429/54

(Continued)

FOREIGN PATENT DOCUMENTS

CN 2796114 Y 7/2006
CN 101682010 A 3/2010
(Continued)

OTHER PUBLICATIONS

EPO Extended European Search Report dated Jun. 9, 2021, issued in corresponding European Patent Application No. 18872607.9 (7 pages).

(Continued)

*Primary Examiner* — Kenneth J Douyette
(74) *Attorney, Agent, or Firm* — Lewis Roca Rothgerber Christie LLP (57) ABSTRACT

A rechargeable battery is introduced, and an exemplary embodiment of the present invention provides a rechargeable battery including: an electrode assembly configured to charge and discharge a current; a case accommodating the electrode assembly therein; a cap plate configured to seal an opening of the case; an electrode terminal electrically connected to the electrode assembly and externally drawn out through the cap plate; a first valve assembly installed in an electrolyte injection opening of the cap plate to open and close the electrolyte injection opening; a gas removal opening formed in the cap plate to remove a gas; and a second valve assembly installed in the gas removal opening to open and close the gas removal opening.

8 Claims, 9 Drawing Sheets

(56) References Cited

U.S. PATENT DOCUMENTS

| | | | |
|---|---|---|---|
| 2010/0233521 A1* | 9/2010 | Byun | H01M 50/538 |
| | | | 429/72 |
| 2011/0244284 A1* | 10/2011 | Jo | H01M 10/0431 |
| | | | 429/94 |
| 2012/0251850 A1 | 10/2012 | Yamamoto et al. | |
| 2016/0240315 A1 | 8/2016 | Onoue et al. | |
| 2017/0018748 A1 | 1/2017 | Matsuura | |
| 2017/0149047 A1 | 5/2017 | Guen | |

FOREIGN PATENT DOCUMENTS

| | | |
|---|---|---|
| CN | 101989660 A | 3/2011 |
| CN | 102823027 A | 12/2012 |
| CN | 104134764 A | 11/2014 |
| CN | 105870398 A | 8/2016 |
| CN | 106356481 A | 1/2017 |
| DE | 102018200870 A1 | 7/2019 |
| KR | 1984-0000918 Y1 | 5/1984 |
| KR | 10-2007-0005338 A | 1/2007 |
| KR | 10-2010-0051403 A | 5/2010 |
| KR | 10-1330890 B1 | 11/2013 |
| KR | 10-2016-0047217 A | 5/2016 |
| KR | 10-2016-0150460 A | 12/2016 |
| KR | 10-2017-0060390 A | 6/2017 |
| WO | WO 2010/053256 A2 | 5/2010 |

OTHER PUBLICATIONS

CNIPA Office Action dated Dec. 30, 2021 issued in CN Patent Application No. 201880070121.X, with English Translation, 24 pages.

\* cited by examiner

RECHARGEABLE BATTERY

CROSS-REFERENCE TO RELATED APPLICATION(S)

This application is a National Phase Patent Application of International Patent Application Number PCT/KR2018/011165, filed on Sep. 20, 2018, which claims priority of Korean Patent Application No. 10-2017-0144715, filed Nov. 1, 2017. The entire contents of both of which are incorporated herein by reference.

TECHNICAL FIELD

The present invention relates to a rechargeable battery, and more particularly, to a rechargeable battery having an electrolyte injection opening in a cap plate.

BACKGROUND ART

A rechargeable battery may be repeatedly charged and discharged, unlike a primary battery. Small-capacity rechargeable batteries are used in portable electronic devices such as mobile phones, notebook computers, and camcorders. Large-capacity and high-density rechargeable batteries are used for power for motor driving of hybrid vehicles and electric vehicles, or energy storage.

Rechargeable batteries for vehicles and energy storage are required to have a long lifespan characteristic, but they do not satisfy long lifespan conditions. That is, since cell deterioration occurs during a use period of the rechargeable batteries, a cell characteristic is deteriorated.

The cell deterioration is accompanied by a decomposition reaction of an electrolyte solution. The electrolyte solution should be easily replenished under a normal environmental condition in order to cope with a decomposition reaction of the electrolyte solution. Such replenishment of the electrolyte solution may delay the cell degradation. That is, the long lifespan of the rechargeable batteries may be implemented.

As the rechargeable batteries increase in capacity and density, cell safety is deteriorated. In the case of Ni-based positive electrode material, an amount of gas generated increases after a chemical conversion operation. However, since a cap plate is configured to perform a degassing operation only once, there are many problems in terms of reliability and safety.

DISCLOSURE

Technical Problem

Exemplary embodiments of the present invention have been made in an effort to provide a rechargeable battery that implements a long lifespan by replenishing an electrolyte solution within a lifespan period.

In addition, the exemplary embodiments of the present invention have been made in an effort to provide a rechargeable battery that implements reliability and safety by additionally degassing a gas generated after a chemical conversion operation and thereafter.

Technical Solution

An exemplary embodiment of the present invention provides a rechargeable battery including: an electrode assembly configured to charge and discharge a current; a case accommodating the electrode assembly therein; a cap plate configured to seal an opening of the case; an electrode terminal electrically connected to the electrode assembly and externally drawn out through the cap plate; a first valve assembly installed in an electrolyte injection opening of the cap plate to open and close the electrolyte injection opening; a gas removal opening formed in the cap plate to remove a gas; and a second valve assembly installed in the gas removal opening to open and close the gas removal opening.

According to the exemplary embodiments of the present invention, the rechargeable battery may further include a vent plate installed in the cap plate or a vent hole of the case.

The first valve assembly may include: a first fixing protrusion formed on an outer surface of the cap plate at an outer circumference of the electrolyte injection opening; a first cap member coupled to the first fixing protrusion and having an opening and closing hole; a first elastic member disposed on an outer surface of the cap plate inside the first fixing protrusion; and a first opening and closing member disposed between the first elastic member and the first cap member to open and close the opening and closing hole.

The first cap member may have a female screw thread on an inner surface thereof, and a male screw formed on an outer surface of the first fixing protrusion is screwed thereto.

The second valve assembly may include: a housing configured to have an inlet and an outlet fixed to the outside of the cap plate at the gas removal opening and connected to the gas removal opening; and a second opening and closing member embedded in the housing via a second elastic member to open and close the inlet.

According to an exemplary embodiment of the present invention, the rechargeable battery may further include a membrane disposed on an inner surface of the cap plate at an outer circumference of the gas removal opening to filter the discharge of an electrolyte solution when a gas is discharged.

The cap plate may include a second fixing protrusion formed on the inner surface thereof at the outer circumference of the gas removal opening, and the membrane may be disposed in the second fixing protrusion and may be fixed to a second cap member coupled to the second fixing protrusion.

The second cap member includes a communication hole corresponding to an inner circumference of the second fixed protrusion, and the communication hole may expose the membrane inside the cap plate.

The membrane may be by using PTFE (polytetrafluoroethylene) or by coating glass fiber with PTFE.

The housing may have a seating groove formed to have a concave shape at a side of the inlet, and the second opening and closing member may be formed to have a convex shape to correspond to the seating groove.

The second valve assembly may further include an adjustment member that supports the second elastic member at an opposite side of the second opening and closing member and screwed to the housing.

The housing may be formed as a cylinder connecting the inlet and the outlet, while the second opening and closing member may be formed as a piston lifting and lowering along the housing, and may include a connection passage connecting the inlet and the outlet.

Advantageous Effects

The exemplary embodiments of the present invention may allow an electrolyte injection opening to be opened and closed by a first valve assembly and a gas removal opening additionally formed on a cap plate to be opened and closed by a second valve assembly, thereby achieving cell deterioration delay and long lifespan by replenishing an electrolyte solution within a lifespan.

In addition, the first and second valves may increase reliability and safety by additionally degassing a gas generated after a chemical conversion operation and thereafter, and the membrane provided in the gas removal opening may discharge only a gas and may block the discharge of the electrolyte solution.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the scope of the present invention.

The drawings and description are to be regarded as illustrative in nature and not restrictive. Like reference numerals designate like elements throughout the specification.

Throughout this specification and the claims that follow, when it is described that an element is "coupled/connected" to another element, the element may be "directly coupled/connected" to the other element or "indirectly coupled/connected" to the other element through a third element. In addition, unless explicitly described to the contrary, the word "comprise" and variations such as "comprises" or "comprising" will be understood to imply the inclusion of stated elements but not the exclusion of any other elements.

Figure 1:
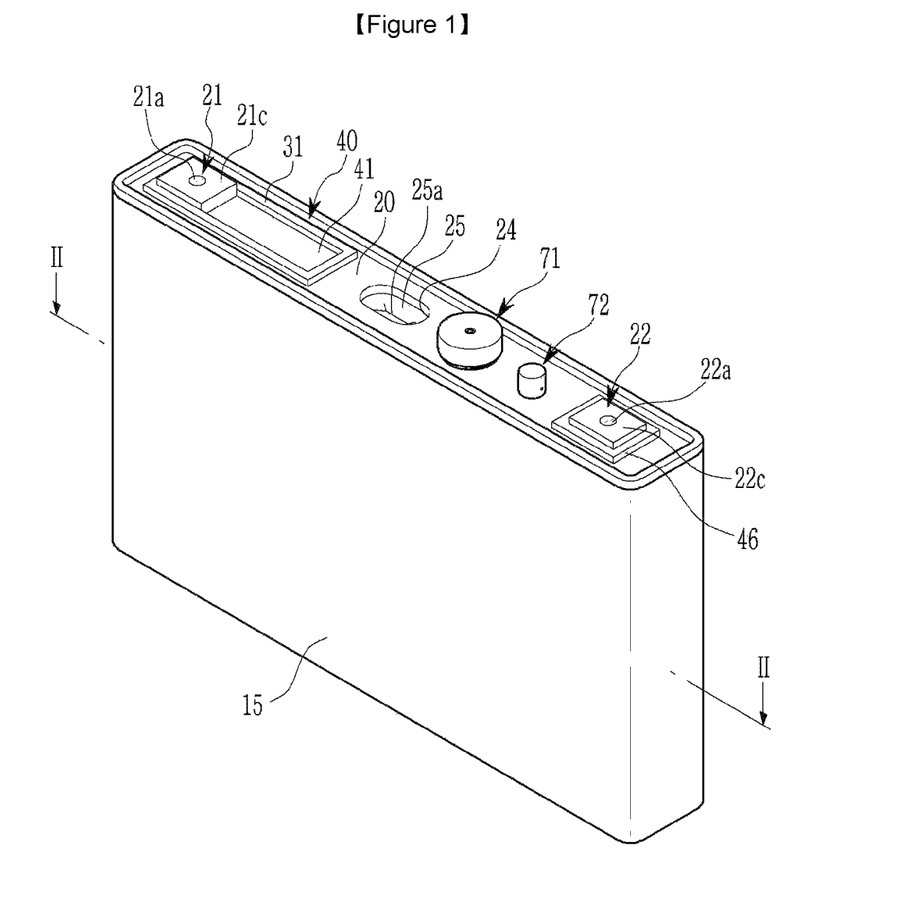
FIG. 1 illustrates a perspective view of a rechargeable battery according to a first exemplary embodiment of the present invention.

Throughout this specification and the claims that follow, it will be understood that when an element such as a layer, film, region, or substrate is referred to as being "on" another element, it can be directly on the other element or intervening elements may also be present. Further, in the specification, the word "~on" or "~over" means positioning on or below the object portion, and does not necessarily mean positioning on the upper side of the object portion based on a gravity direction. FIG. 1 illustrates a perspective view of a rechargeable battery according to a first exemplary embodiment of the present invention, and FIG. 2 illustrates a cross-sectional view taken along a line II-II of FIG. 1.

Figure 2:
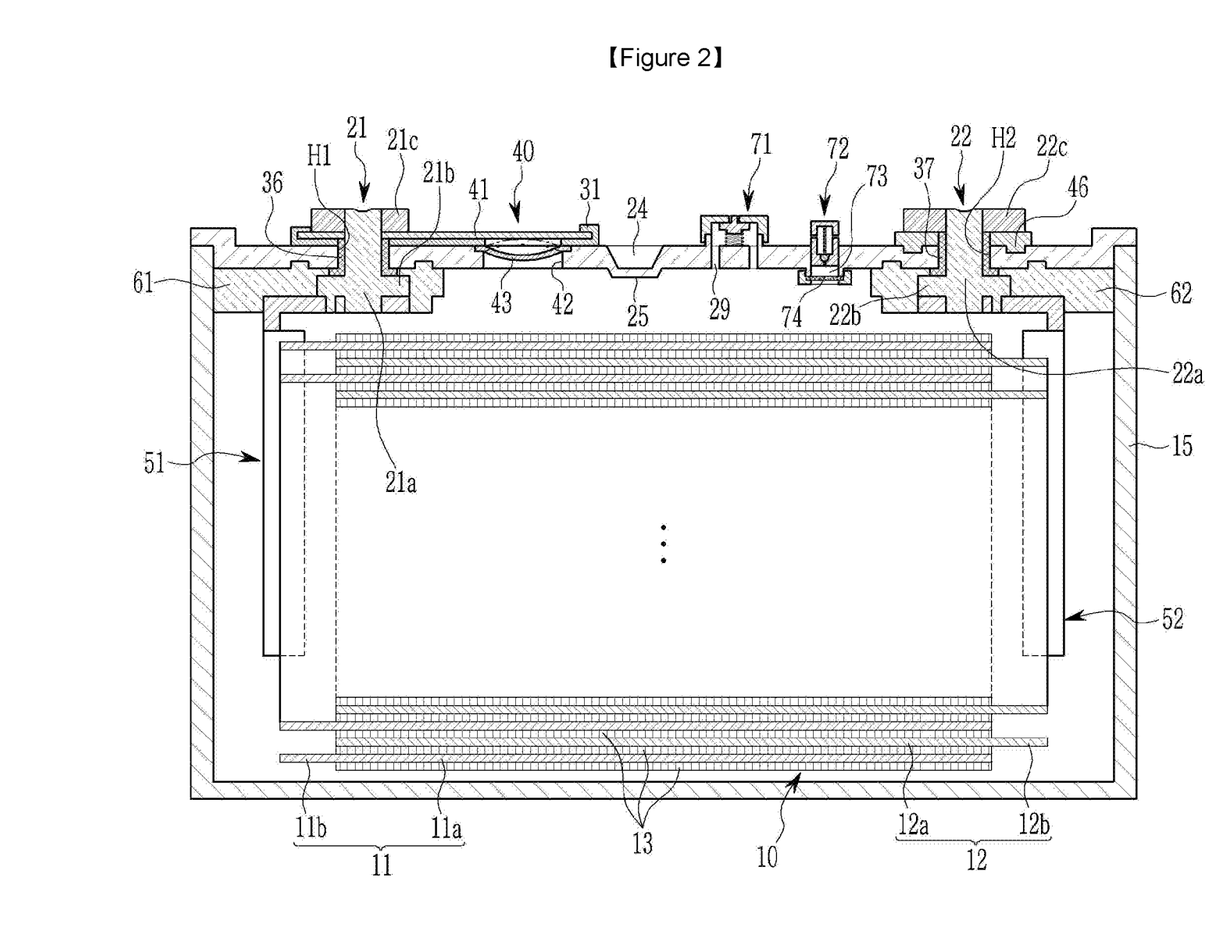
FIG. 2 illustrates a cross-sectional view taken along a line II-II of FIG. 1.

Referring to FIG. 1 and FIG. 2, the rechargeable battery of the first exemplary embodiment includes an electrode assembly 10 configured to charge and discharge a current, a case 15 accommodating the electrode assembly 10, a cap plate 20 configured to seal an opening of the case 15, and electrode terminals (negative and positive terminals) 21 and 22 installed in the cap plate 20. The rechargeable battery may further include an external short circuit portion 40 disposed at a side of the negative terminal 21.

For example, in the electrode assembly 10, a first electrode (hereinafter referred to as a "negative electrode") 11 and a second electrode (hereinafter referred to as a "positive electrode") 12 may be disposed on opposite surfaces of a separator 13, and the negative electrode 11, the separator 13, and the positive electrode 12 may be wound in a jellyroll state.

The negative electrode 11 and the positive electrode 12 respectively include coated regions 11a and 12a coated with an active material on a current collector of a metal plate, and uncoated regions 11b and 12b formed of a current collector exposed without coating an active material.

The uncoated portion 11b of the negative electrode 11 is formed at an end portion of the negative electrode 11 along the negative electrode 11 to be spiral-wound. The uncoated portion 12b of the positive electrode 12 is formed at an end portion of the positive electrode 12 along the positive electrode 12 to be spiral-wound.

As such, the uncoated regions 11b and 12b may be disposed at opposite ends of the electrode assembly 10, respectively. Although not illustrated, uncoated regions may be disposed in parallel at an end portion of the electrode assembly facing the cap plate.

For example, the case 15 is formed to have a substantially cuboidal shape so as to set a space for accommodating the electrode assembly 10 and an electrolytic solution therein, and an opening for connecting the outside and the inside space is formed on one surface of the cuboidal shape. The opening allows the electrode assembly 10 to be inserted into the case 15.

The cap plate 20 is installed in the opening of the case 15 to seal the opening of the case 15. For example, the case 15 and the cap plate 20 may be made of aluminum to be welded to each other.

In addition, the cap plate 20 further includes terminal holes H1 and H2, an electrolyte injection opening 29, a vent hole 24, and a gas removal opening 73. The electrolyte injection opening 29 is equipped with a first valve assembly 71 to open and close the electrolyte injection opening 29 so that an electrolyte solution can be replenished within a lifespan period.

The gas removal opening 73 is equipped with a second valve assembly 72 to open and close the gas removal opening so that a gas can be additionally removed when an electrolyte solution is replenished by an operation of the first valve assembly 71.

The negative and positive electrode terminals 21 and 22 are electrically and mechanically connected to the electrode assembly 10 to be installed in the terminal holes H1 and H2 of the cap plate 20, respectively. In other words, the negative and positive terminals 21 and 22 are electrically connected to the negative and positive electrodes 11 and 12 of the electrode assembly 10, respectively. Accordingly, the electrode assembly 10 is drawn out of the case 15 through the negative and positive terminals 21 and 22.

Since the negative and positive terminals 21 and 22 form a same structure with each other inside the cap plate 20, the same structure will be described together, and since the negative and positive terminals 21 and 22 form different structures from each other outside the cap plate 20, the different structures will be described separately.

The positive and negative terminals 21 and 22 respectively include rivet terminals 21a and 22a installed in the terminal holes H1 and H2 of the cap plate 20, flanges 21b and 22b integrally formed in the rivet terminal 21a and 22a inside the cap plate 20, and plate terminals 21c and 22c disposed outside the cap plate 20 to be connected to the rivet terminals 21a and 22a by riveting or welding.

Negative and positive gaskets 36 and 37 may be respectively installed between the rivet terminals 21a and 22a of the positive and negative terminal 21 and 22 and inner surfaces of the terminal holes H1 and H2, to perform sealing and electrical insulation between the rivet terminals 21a and 22a of the negative and positive terminals 21 and 22 and the cap plate 20.

The negative and positive gaskets 36 and 37 may extend further between the flanges 21b and 22b and the inner surface of the cap plate 20, to perform further sealing and electrical insulation between the flanges 21b and 22b and the cap plate 20. That is, the positive and negative gaskets 36 and 37 prevent leakage of the electrolyte solution through the terminal holes H1 and H2 when installing the negative and positive terminals 21 and 22 in the cap plate 20.

For example, negative and positive lead tabs 51 and 52 electrically and mechanically connect the negative and positive terminals 21 and 22 to the negative and positive electrodes 11 and 12 of the electrode assembly 10, respectively. That is, the negative and positive lead tabs 51 and 52 are connected to lower ends of the rivet terminals 21a and 22a while being supported by the flanges 21b and 22b by coupling the negative and positive lead tabs 51 and 52 to the lower ends of the rivet terminals 21a and 22a to caulk the lower ends thereof.

Negative and positive insulating members 61 and 62 are respectively installed between the negative and positive electrode lead tabs 51 and 52 and the cap plate 20, to electrically insulate the negative and positive lead tabs 51 and 52 and the cap plate 20.

In addition, the negative and positive electrode insulating members 61 and 62 are coupled to the cap plate 20 at first sides, and surround the negative and positive electrode lead tabs 51 and 52, the rivet terminals 21a and 22a, and the flanges 21b and 22b at second sides, to thereby stabilize their connection structures.

Meanwhile, an external short circuit portion 40 will be described in relation to the plate terminal 21c of the negative electrode terminal 21, and a top plate 46 will be described in relation to the plate terminal 22c of the positive electrode terminal 22.

The external short circuit portion 40 close to the negative electrode terminal 21 includes a short-circuit tab 41 and a short-circuit member 43 which are spaced apart or short-circuited depending on internal pressure that may be generated during overcharging. The short-circuit tab 41 is electrically connected to the rivet terminal 21a of the negative terminal 21, and is disposed outside the cap plate 20 via an insulating member 31.

The insulation member 31 is installed between the short-circuit tab 41 and the cap plate 20 to electrically insulate the short-circuit tab 41 and the cap plate 20. That is, the cap plate 20 is maintained in an electrically insulated state from the negative terminal 21.

The short-circuit tab 41 and the plate terminal 21c are coupled to an upper end of the rivet terminal 21a by coupling the short-circuit tab 41 and the plate terminal 21c to the upper end of the rivet terminal 21a to caulk the upper end thereof. Accordingly, the short-circuit tab 41 and the plate terminal 21c are fixed to the cap plate 20 with the insulating member 31 interposed therebetween.

The short-circuit member 43 is installed in a short-circuit hole 42 formed in the cap plate 20 to seal the short-circuit hole 42 to thereby receive the internal pressure of the rechargeable battery. The short-circuit tab 41 is connected to the negative terminal 21 to extend along the outside of the short-circuit member 43. Accordingly, the short-circuit tab 41 and the short-circuit member 43 may correspond to the short-circuit hole 42 and maintain a separated state (solid line) by facing each other, and may form a short-circuit state (imaginary line state) by inversion of the short-circuit member 43 when an internal voltage of the rechargeable battery increases.

The top plate 46 close to the positive terminal 22 electrically connects the plate terminal 22c of the positive terminal 22 and the cap plate 20. For example, the top plate 46 is disposed between the plate terminal 22c and the cap plate 20 to extend through the rivet terminal 22a.

Accordingly, the top plate 46 and the plate terminal 22c are coupled to an upper end of the rivet terminal 22a by coupling the top plate 46 and the plate terminal 22c to the upper end of the rivet terminal 22a to caulk the upper end thereof. The plate terminal 22c is installed outside the cap plate 20 with the top plate 46 disposed therebetween.

On the other hand, the positive gasket 37 is further extended between the rivet terminal 22a and the top plate 46. That is, the positive gasket 37 prevents the rivet terminal 22a and the top plate 46 from being directly electrically connected.

Thus, the rivet terminal 22a is electrically connected to the top plate 46 via the plate terminal 22c. That is, the cap plate 20 is connected with the positive terminal 22 to be positively charged.

As a result, the negatively charged short-circuit tab 41 and the positively charged short-circuit member 43 may form an external short circuit with an increase in internal pressure generated during overcharging, thereby safely discharging a current charged in the electrode assembly 10 from the outside.

A vent plate 25 is installed in the vent hole 24 of the cap plate 20 (or a case (not illustrated)), and is cut during a cell event to discharge gas from the inside of the rechargeable battery to the outside. For example, the vent plate 25 may be a thin film plate that is integrally formed with the cap plate 20.

The vent plate 25 is installed to seal the vent hole 24 to release the internal pressure of the rechargeable battery. In other words, when the internal pressure reaches a predetermined pressure, the vent plate 25 is cut to open the vent hole 24. The vent plate 25 includes a notch 25a for guiding an incision thereof.

Figure 3:
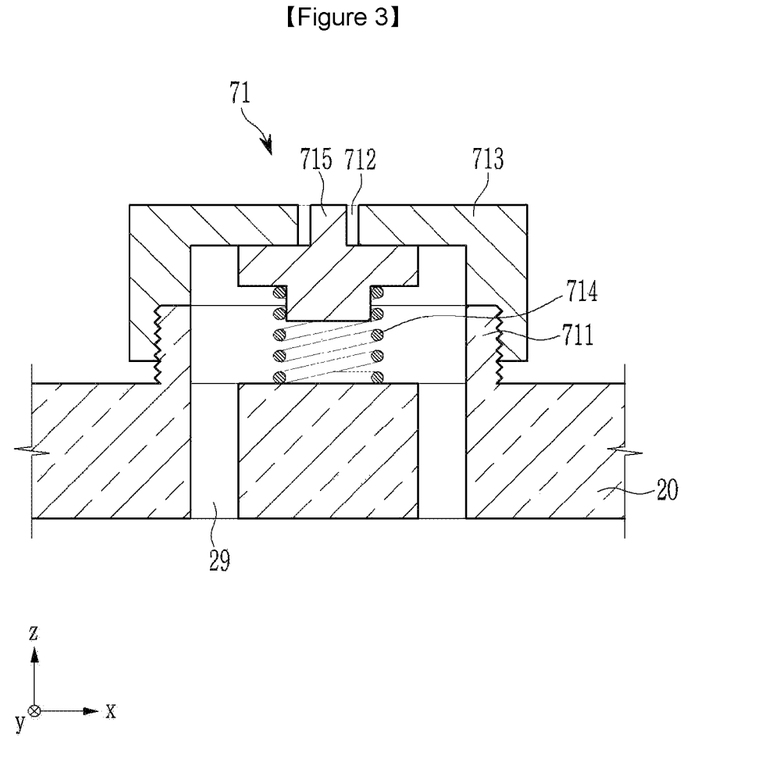
FIG. 3 illustrates an enlarged cross-sectional view showing an electrolyte injection opening in a cap plate of FIG. 2.
Figure 4:
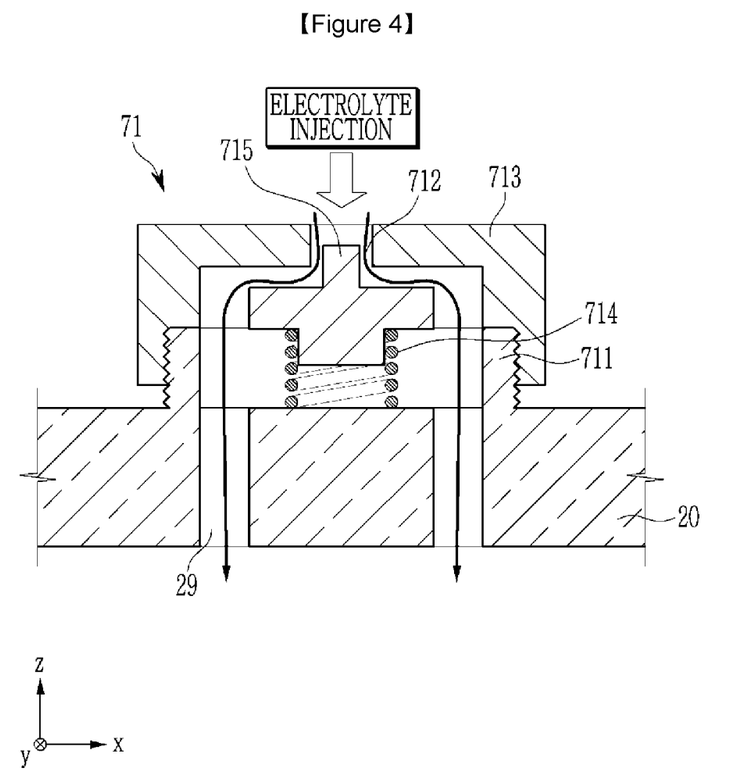
FIG. 4 illustrates an operation state view in which the electrolyte injection opening of FIG. 3 is opened by a first valve assembly during electrolyte solution replenishment.

FIG. 3 illustrates an enlarged cross-sectional view showing an electrolyte injection opening in a cap plate of FIG. 2, and FIG. 4 illustrates an operation state view in which the electrolyte injection opening of FIG. 3 is opened by a first valve assembly during electrolyte solution replenishment.

Referring to FIG. 1 to FIG. 4, the electrolyte injection opening 29 allows the electrolyte solution to be injected into the case 15 after the cap plate 20 is coupled to the case 15. A first valve assembly 71 is provided at the electrolyte injection opening 29 so as to open the electrolyte injection opening 29 when the electrolyte solution is replenished during an injection period of an electrolyte solution in an assembling process of the rechargeable battery and a lifespan period.

For example, the first valve assembly 71 includes a first fixing protrusion 711 on an outer surface of the cap plate 20, a first cap member 713 having an opening and closing hole 712, a first elastic member 714, and a first opening and closing member 715.

The electrolyte injection opening 29 may be formed in various ways depending on a structure of the first valve assembly 71. In the first exemplary embodiment, since the first opening and closing member 715 opens and closes the opening and closing hole 712 in the middle, the electrolyte injection opening 29 is formed at a position shifted from the opening and closing hole 712 in the vertical direction (z-axis direction).

The first fixing protrusion 711 protrudes from the outer surface of the cap plate 20 at the outer circumference (based on an x-y plane) of the electrolyte injection opening 29. The first fixing protrusion 711 allows the first valve assembly 71 to be installed in the cap plate 20.

The first cap member 713 has the opening and closing hole 712, to be coupled to the first fixing protrusion 711. The opening and closing hole 712 enables the injection and replenishment of the electrolyte solution when the electrolyte solution is replenished in an assembling process of the rechargeable battery and during the lifespan period. As a specific example, the first cap member 713 has a female thread formed on an inner surface thereof, and a male thread formed on an outer surface of the first fixing protrusion 711 is screwed thereto.

The first elastic member 714 is disposed on an outer surface of the cap plate 20 at an inner side (based on the x-y plane) of the first fixing protrusion 711. The first opening and closing member 715 is disposed between the first elastic member 714 and the first cap member 713 to elastically open and close the opening and closing hole 712.

For example, when an elastic force of the first elastic member 714 is greater than a force for opening the opening and closing hole 712 (see FIG. 3), the first opening and closing member 715 closes the opening and closing hole 712. Accordingly, the electrolyte solution positioned therein is blocked in the opening and closing hole 712 by the first valve assembly 71.

On the contrary, when an electrolyte injection force acting from the outside into the opening and closing hole 712 is greater than an elastic force of the first elastic member 714 (see FIG. 4), the first opening and closing member 715 opens the opening and closing hole 712. As a result, the electrolyte solution is internally injected or supplemented through the electrolyte injection opening 29.

Figure 5:
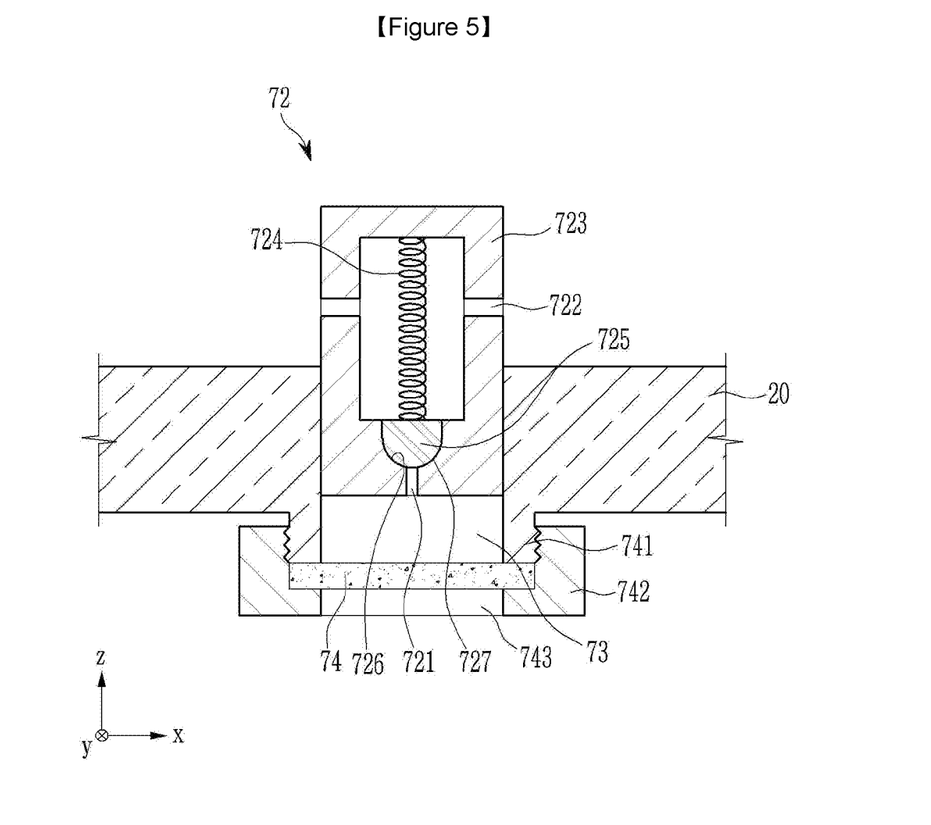
FIG. 5 is an enlarged cross-sectional view of a gas removal opening of the cap plate of FIG. 2.
Figure 6:
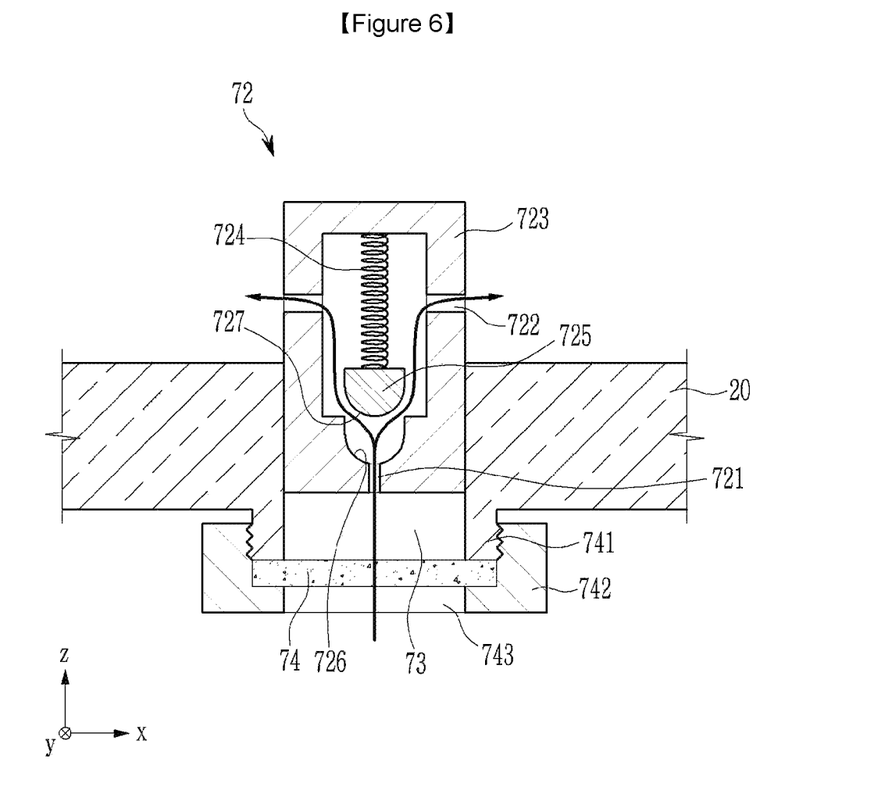
FIG. 6 illustrates an operating state view in which the gas removal opening of FIG. 5 is opened by a second valve assembly during gas discharge.

FIG. 5 is an enlarged cross-sectional view of a gas removal opening of the cap plate of FIG. 2, and FIG. 6 illustrates an operating state view in which the gas removal opening of FIG. 5 is opened by a second valve assembly during gas discharge.

Referring to FIG. 1, FIG. 2, FIG. 5, and FIG. 6, the gas removal opening 73 may remove the gas generated inside the case 15 after the cap plate 20 is coupled to the case 15. That is, the second valve assembly 72 is provided in the gas removal opening 73 so as to open the gas removal opening 73 when the electrolyte solution is replenished during the lifespan of the rechargeable battery.

For example, the second valve assembly 72 includes a housing 723 having an inlet 721 and an outlet 722 connected to the gas removal opening 73, an elastic member 724, and a second opening and closing member 725.

In the gas removal opening 73, the housing 723 is coupled to the gas removal opening 73 of the housing 723 in a gas tight structure. In this case, the inlet 721 provided in the housing 723 is connected to the gas removal opening 73, and the outlet 722 is connected to the outside of the cap plate 20. The second elastic member 724 is embedded in the housing 723 to apply an elastic force to the second opening and closing member 725 to close the inlet 721 by the second opening and closing member 725.

In addition, the housing 723 has a seating groove 726 formed to have a concave shape (e.g., a concave curved surface) at one side of the inlet 721. The second opening and closing member 725 is formed to have a convex shape (e.g., convex curved surface 727) to correspond to the seating groove 726. The seating groove 726 and the convex curved surface 727 may form a large area to increase the airtightness of the inlet 721.

For example, when the elastic force of the second elastic member 724 is greater than the force to open the inlet 721 (see FIG. 5), the second opening and closing member 725 closes the inlet 721. Therefore, the gas positioned therein is blocked in the inlet 721 by the second valve assembly 72.

On the contrary, when an internal pressure acting on the second opening and closing member 725 is greater than the elastic force of the second elastic member 724 due to the injection and the replenishment of the electrolyte solution (see FIG. 6), the second opening and closing member 725 may open the inlet 721. As a result, the gas is discharged to the outside through the gas removal opening 73, the inlet 721 and the outlet 722.

On the other hand, the gas removal opening 73 is further provided with a membrane 74. The membrane 74 is disposed on the inner surface of the cap plate 20 on the outer circumference (x-y plane) of the gas removal opening 73, to filter the discharge of the electrolyte solution when the gas is discharged to the gas removal opening 73.

For installation of the membrane 74, the cap plate 20 includes a second fixing protrusion 741 formed on the inner surface thereof at the outer circumference of the gas removal opening 73. The membrane 74 is fixed to a second cap member 742 disposed in the second fixing protrusion 741 to be coupled to the second fixing protrusion 741.

The second cap member 742 has a communication hole 743 corresponding to an inner circumference of the second fixed protrusion 741, and the communication hole 743 exposes the membrane 74 inside the cap plate 20.

As an example, the membrane 74 is formed by using PTFE (polytetrafluoroethylene) or by coating glass fiber with PTFE, so it is not dissolved in the electrolyte solution. That is, the membrane 74 may continuously block the electrolyte solution and discharge only the gas.

The second valve assembly 72 performs a degassing process and is closed after precharging. After the rechargeable battery is assembled and then a chemical conversion process (charging and discharging and aging) is completed, additional gas is generated when a high temperature chemical conversion process is performed in a fully charged state.

The gas generated at this time is discharged through the membrane 74 and the second valve assembly 72. After the gas is generated only to an optimum condition, the degassing process is re-performed through the membrane 74 and the second valve assembly 72, and then the second valve assembly 72 is closed.

Therefore, the reliability and safety of the rechargeable battery is improved, and deformation of the electrode assembly 10 does not occur. In addition, the cap plate 20 can easily replenish the electrolyte solution even in a normal use environment condition, in order to satisfy a long lifespan characteristic. That is, it is possible to prevent cell deterioration.

On the other hand, during the degassing process, when the second valve assembly 72 is opened, the vent plate 25 is maintained in a blocked state. Substantially, during the cell event, the second valve assembly 72 is actuated to release the internal pressure before the vent plate 25 is actuated.

However, due to the installation of the second valve assembly 72, in the cell event, it may occur that the internal pressure cannot be safely released to the second valve assembly 72. That is, when the cell event occurs in a failure state of the second valve assembly 72, the vent plate 25 may be actuated to safely release the internal pressure.

Hereinafter, another exemplary embodiment of the present inventions will be described. The same configuration will be omitted and different configurations will be described by comparing the first exemplary embodiment and the previously described exemplary embodiment with other exemplary embodiments.

Figure 7:
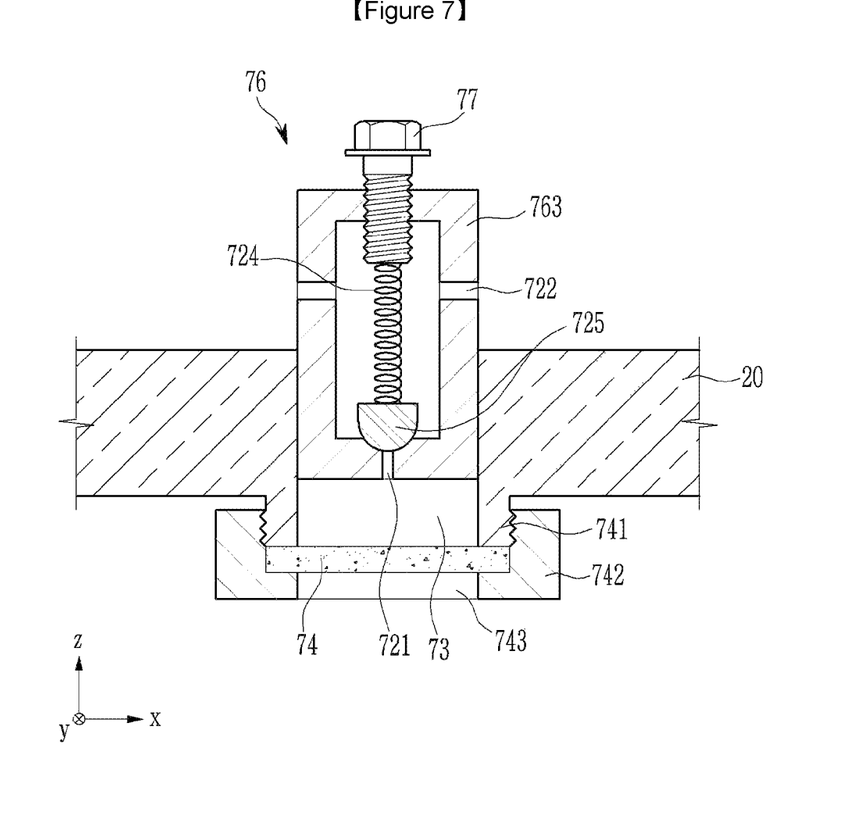
FIG. 7 illustrates an enlarged cross-sectional view of a gas removal opening in a cap plate of a rechargeable battery according to a second exemplary embodiment of the present invention.

FIG. 7 illustrates an enlarged cross-sectional view of a gas removal opening in a cap plate of a rechargeable battery according to a second exemplary embodiment of the present invention. Referring to FIG. 7, in the rechargeable battery of the second exemplary embodiment, a second valve assembly 76 further includes an adjustment member 77 that supports the second elastic member 724 at an opposite side of the second opening and closing member 725 and is screwed to the housing 763.

The adjustment member 77 may be screwed to the housing 763 to set the elastic force of the second elastic member 724 depending on a length of protruding into the housing 763. That is, the adjustment member 77 may set the elastic force of the second elastic member 724 in which the second opening and closing member 725 is opened and closed by the internal pressure.

For example, the adjusting member 77 may set the elastic force of the second elastic member 724 differently during the chemical conversion process and in shipment of a finished product. That is, during the chemical conversion process, the elastic force of the second elastic member 724 may be lowered to facilitate the discharge of gas, and in the finished product, a stable actuation of the vent plate 25 may be implemented by setting the elastic force of the second elastic member 724 to be higher than the cutting pressure of the vent plate 25.

Figure 8:
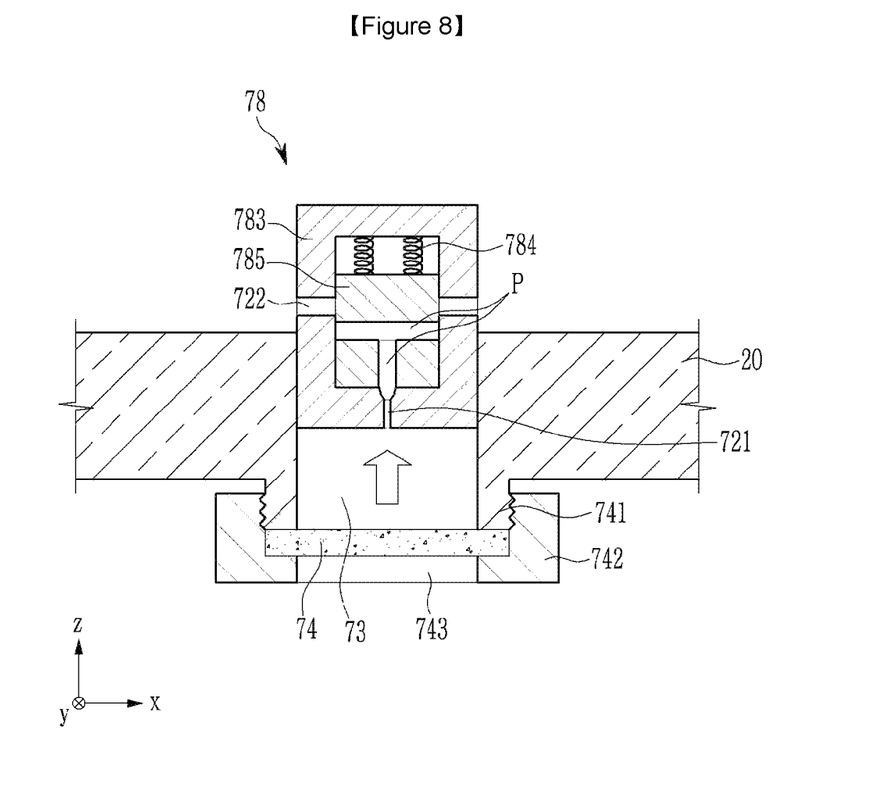
FIG. 8 illustrates an enlarged cross-sectional view of a gas removal opening in a cap plate of a rechargeable battery according to a third exemplary embodiment of the present invention.
Figure 9:
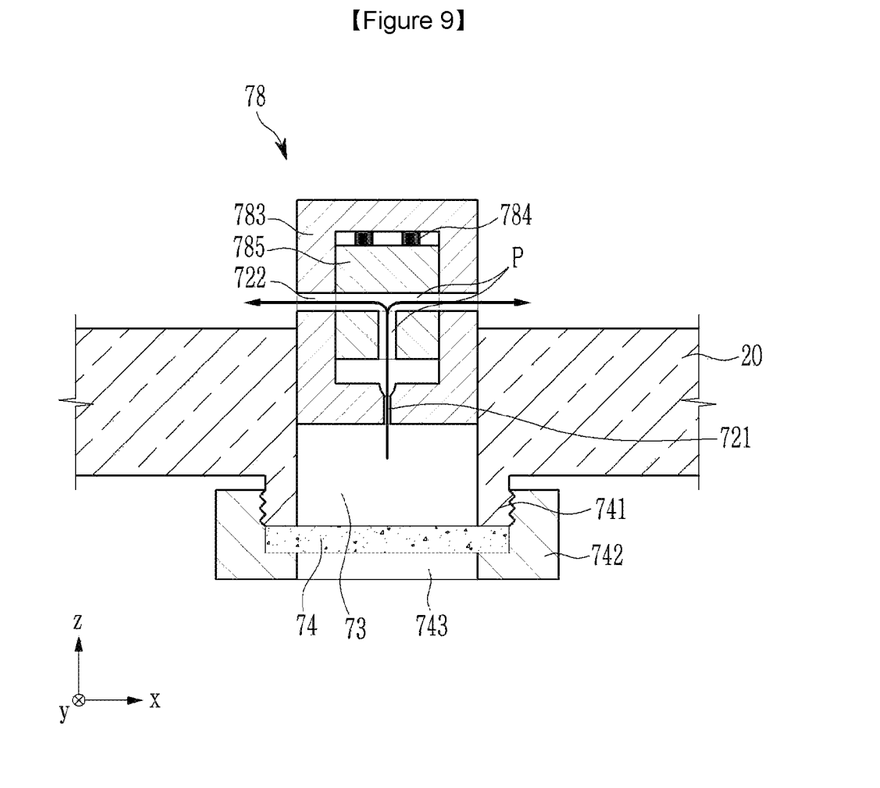
FIG. 9 illustrates an operating state view in which the gas removal opening of FIG. 8 is opened during gas discharge.

FIG. 8 illustrates an enlarged cross-sectional view of a gas outlet in a cap plate of a rechargeable battery according to a third exemplary embodiment of the present invention, and FIG. 9 illustrates an operating state view in which the gas outlet of FIG. 8 is opened during gas discharge.

Referring to FIG. 9 and FIG. 10, in the rechargeable battery of the third exemplary embodiment, a housing 783 of the second valve assembly 78 is formed as a cylinder connecting the inlet 721 and the outlet 722.

A second opening and closing member 785 is formed as a piston lifting and lowering along the cylinder, and has a connection passage P connecting the inlet 721 and the outlet 722. The second opening and closing member 785 is embedded in the housing 783 to apply an elastic force to the second opening and closing member 785 to control the connection between the inlet 721 and the outlet 722 by the second opening and closing member 785. That is, the connection passage P may connect or block the inlet 721 and the outlet 722 depending on the position of the second opening and closing member 785 on the housing 783.

For example, when the elastic force of a second elastic member 784 is greater than the internal pressure acting on the second opening and closing member 785 through the inlet 721 (see FIG. 8), the second opening and closing member 785 blocks the inlet 721 and the outlet 722. Therefore, the gas positioned therein is blocked in the inlet 721 by a second valve assembly 78.

On the contrary, when an internal pressure acting on the second opening and closing member 785 is greater than the elastic force of the second elastic member 784 due to the injection and the replenishment of the electrolyte solution (see FIG. 9), the second opening and closing member 785 connects the inlet 721 and the outlet 722 to each other. As a result, the gas is discharged to the outside through the gas removal opening 73, the inlet 721 and the outlet 722.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims.

- Description of Symbols -

| | |
|---|---|
| 10: electrode assembly | 11: first electrode (negative electrode) |
| 11a, 12a: coated region | 11b, 12b: uncoated region |
| 12: second electrode (positive electrode) | 13: separator |
| 15: case | 20: cap plate |
| 21, 22: electrode terminal (negative and positive terminal) | |
| 21a, 22a: rivet terminal | |
| 21b, 22b: flange | 21c, 22c: plate terminal |
| 24: vent hole | 25: vent plate |
| 25a: notch | 29: electrolyte injection opening |
| 36, 37: negative and positive gasket | |
| 40: external short circuit | |
| 41: short-circuit tab | 43: short circuit member |
| 42: short-circuit hole | 46: top plate |
| 51, 52: negative and positive electrode lead tab | |
| 61, 62: negative and positive insulating member | |
| 71: first valve assembly | 72, 76, 78: second valve assembly |
| 73: gas removal opening | 74: membrane |
| 711: first fixing protrusion | 712: opening and closing hole |
| 713: first cap member | 714: first elastic member |
| 715: first opening and closing member | 721: inlet |
| 722: outlet | 723, 763, 783: housing |

-continued

| - Description of Symbols - | |
|---|---|
| 724: second elastic member | |
| 725, 785: second opening and closing member | |
| 726: seating groove | 727: convex curved surface |
| 741: second fixing protrusion | 742: second cap member |
| 743: communication hole | 777: adjustment member |
| H1, H2: terminal hole | P: connection passage |

The invention claimed is:

1. A rechargeable battery comprising:
an electrode assembly configured to charge and discharge a current;
a case accommodating the electrode assembly therein;
a cap plate configured to seal an opening of the case;
an electrode terminal electrically connected to the electrode assembly and externally drawn out through the cap plate;
a first valve assembly installed in an electrolyte injection opening of the cap plate to open and close the electrolyte injection opening;
a gas removal opening formed in the cap plate to remove a gas; and
a second valve assembly installed in the gas removal opening to open and close the gas removal opening, and comprising:
a housing configured to have an inlet and an outlet fixed to an outside of the cap plate at the gas removal opening and connected to the gas removal opening; and
a second opening and closing member embedded in the housing via a second elastic member to open and close the inlet.

2. The rechargeable battery of claim 1, further comprising a membrane on an inner surface of the cap plate at an outer circumference of the gas removal opening to filter the discharge of an electrolyte solution when a gas is discharged.

3. The rechargeable battery of claim 2, wherein the cap plate comprises a second fixing protrusion on the inner surface thereof at the outer circumference of the gas removal opening, and wherein the membrane is in the second fixing protrusion and is fixed to a second cap member coupled to the second fixing protrusion.

4. The rechargeable battery of claim 3, wherein the second cap member defines a communication hole corresponding to an inner circumference of the second fixed protrusion, and wherein the communication hole exposes the membrane inside the cap plate.

5. The rechargeable battery of claim 2, wherein the membrane is formed by using PTFE (polytetrafluoroethylene) or by coating glass fiber with PTFE.

6. The rechargeable battery of claim 1, wherein the housing has a seating groove having a concave shape at a side of the inlet, and wherein the second opening and closing member comprises a convex shape to correspond to the seating groove.

7. The rechargeable battery of claim 1, wherein the second valve assembly further comprises an adjustment member that supports the second elastic member at an opposite side of the second opening and closing member and that is screwed to the housing.

8. The rechargeable battery of claim 1, wherein the housing comprises a cylinder connecting the inlet and the outlet, while the second opening and closing member is formed as a piston configured to lift and lower along the housing, and comprises a connection passage connecting the inlet and the outlet.

* * * * *